Jan. 12, 1932.   C. H. WISHMEIER   1,840,995
SEAT COVER
Filed May 15, 1930   3 Sheets-Sheet 1

Inventor
CHARLES H. WISHMEIER
By Owen H. Spencer
Attorney

Jan. 12, 1932.    C. H. WISHMEIER    1,840,995
SEAT COVER
Filed May 15, 1930    3 Sheets-Sheet 2
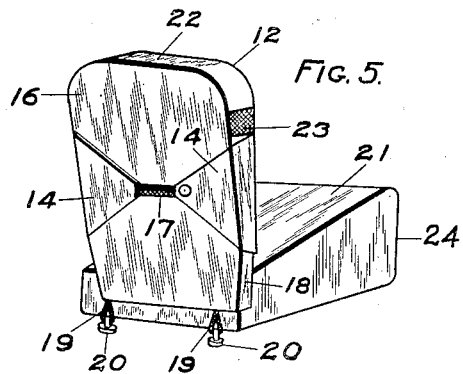
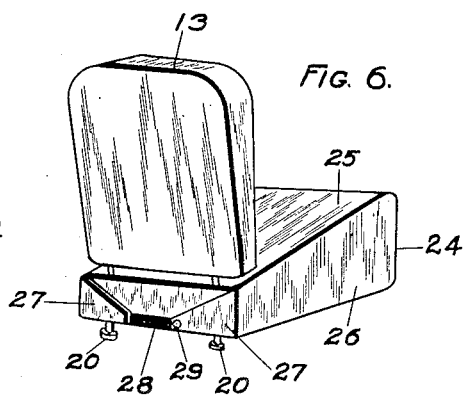
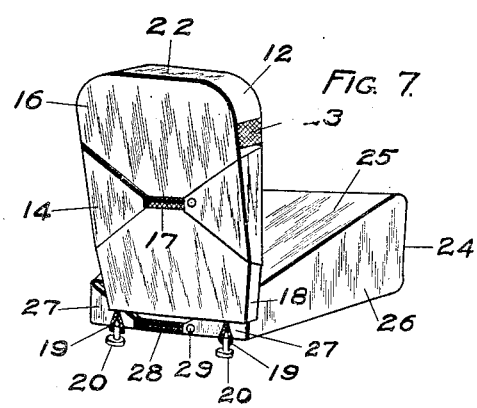
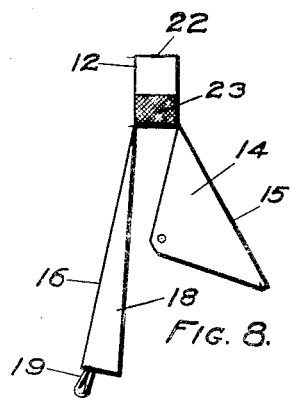
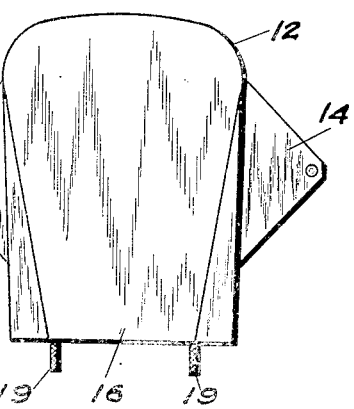
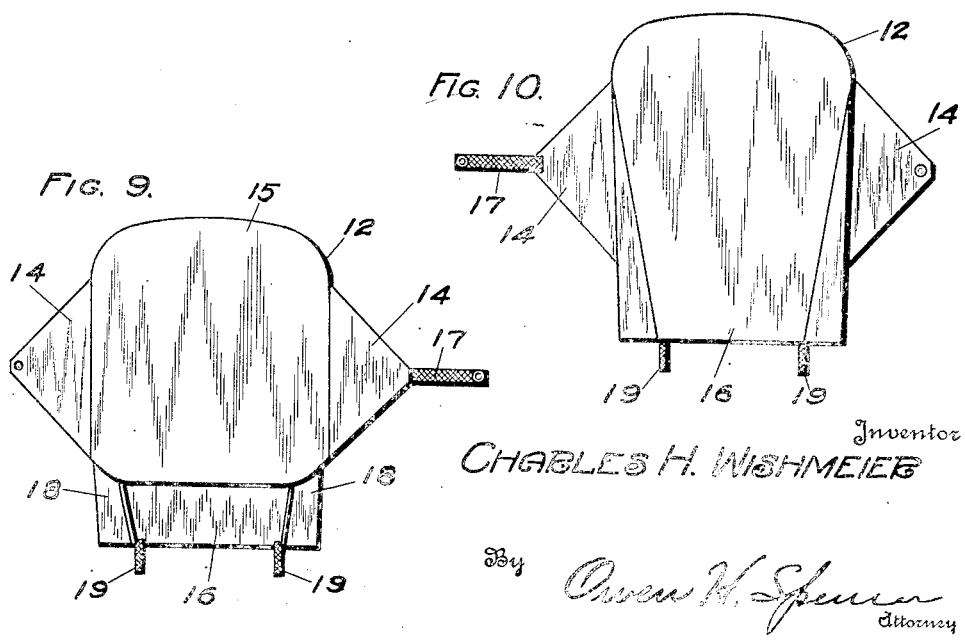
Inventor
CHARLES H. WISHMEIER
By Owen H. Spencer
Attorney Jan. 12, 1932.   C. H. WISHMEIER   1,840,995
SEAT COVER
Filed May 15, 1930   3 Sheets-Sheet 3

Inventor
CHARLES H. WISHMEIER
By Owen H. Spencer
Attorney

Patented Jan. 12, 1932

1,840,995

UNITED STATES PATENT OFFICE

CHARLES H. WISHMEIER, OF INDIANAPOLIS, INDIANA

SEAT COVER

Application filed May 15, 1930. Serial No. 452,532.

This invention relates to seat covers and primarily for covering the seat and back forming cushions of a vehicle and one feature of the invention is the provision of a cover that may be adjusted to cover cushions of different lengths and widths.

A further feature of the invention is the provision of means for interlocking the covers with the seat and back forming cushions.
A further feature of the invention is in so constructing the interlocking means that the operation of attaching or releasing the same may be quickly accomplished.

A further feature of the invention is in so constructing the covers that they will constitute a slip over structure.

Other objects and advantages will be hereinafter more fully set forth and pointed out in the accompanying specification.
In the accompanying drawings which are made a part of this application, Figure 1 is a perspective view of a seat cushion with a cover structure thereover and ready to be secured to the cushion.
Figure 2 is a perspective view showing the manner of attaching the cover to a seat of smaller dimensions than that shown in Fig. 1.

Figure 5 is a perspective view of what is known as a coach seat with a cover over the back forming cushion thereof.

Figure 6 is a similar view with a cover over the seat forming portion thereof.

Figure 7 is a similar view with a cover over both the back and seat forming cushions thereof.

Figure 8 is an edge elevation of the cover for the back forming cushion ready to be applied to use.

Figure 9 is a plan view of the front face of the cover for the back forming cushion, and Figure 10 is a similar view of the opposite face thereof.

Figure 1:
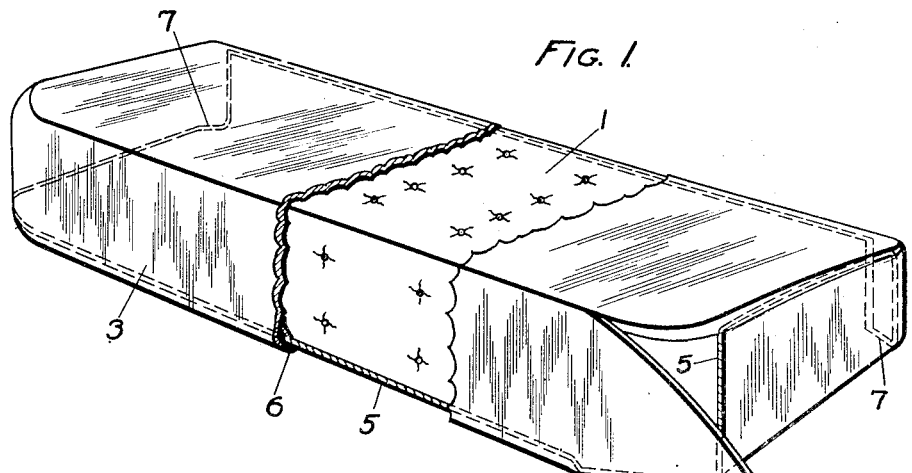

Referring to the drawings in which similar reference numerals designate corresponding parts throughout the several views, the numeral 1 indicates a seat forming cushion for an automobile or other vehicle, which may be constructed in any desired size and shape and 2 indicates the back forming cushion for the seat.

It is customary to cover the seat and back forming cushions of automobile seats, especially in the summer months, with temporary covers, and to this end a cover 3, of any suitable fabric, is placed over the seat forming cushion 1, one end of the cover 3 having a flap 4 adapted to fit around and over one end of the cushion 1, any suitable fastening means being used for anchoring the free end of the flap.

Extending around the edges of the cover 3 is an interlocking cable 5 parts thereof being enclosed by folding the edges of the cover over parts of the cable and securing the folded over portions to the remainder of the cover by sewing or otherwise, to form pockets 6, while portions 7 of the cable are left exposed for interlocking with the lower corners of the cushion 1. In applying this form of cover, the cover is first placed over the cushion 1 and the exposed portions 7 of the cable 5 positioned below the corners of the cushion. One of the exposed portions 7 is then grasped and a pull exerted thereon in order to tightly draw the cable around the edges of the cushion, after which the cable is tied or knotted, as shown at 8 to hold the cable taut around the cushion. The flap 4 is then folded over the end of the cushion 1 and fastened in this position.

Figure 2:
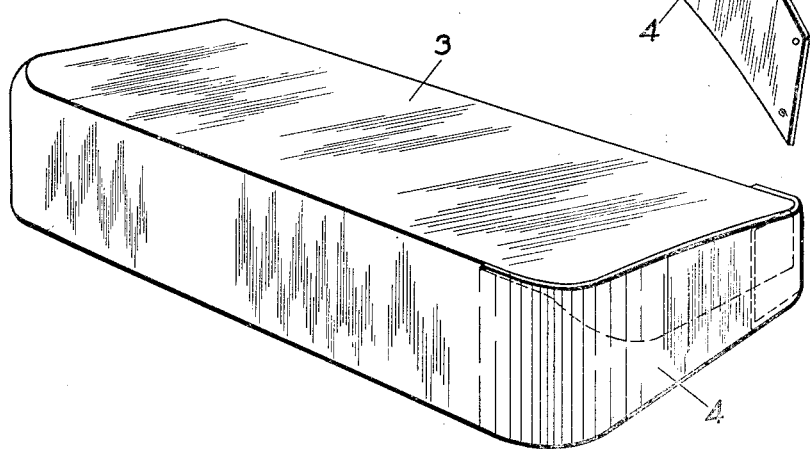
Figure 3:
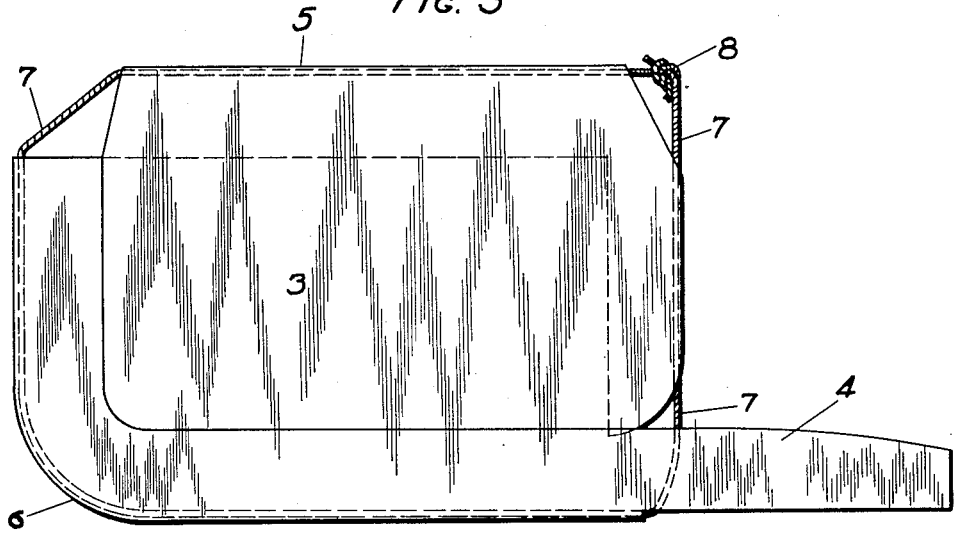
Figure 3 is a plan view of the cover in spread out position.
Figure 4:
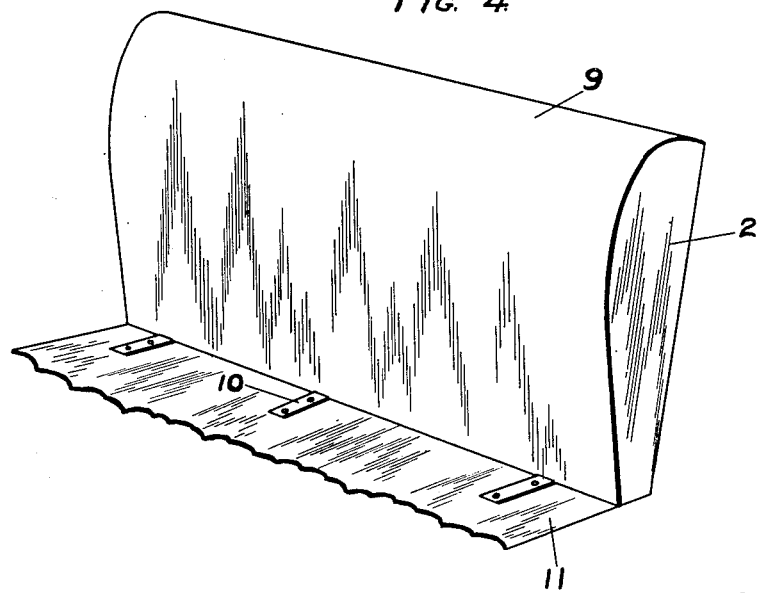
Figure 4 is a perspective view of the back forming cushion of a seat with a cover thereover.

As best shown in Fig. 2, this form of cover may be folded in at the flap end thereof and down along the rear edge of the cushion, adapting the cover for use in connection with a cushion of less width and length than that shown in Fig. 1, thus making the one cover universal for the different sized cushions encountered.

The cover 9 for the back forming cushion 2 is so constructed that the top edge and end edges may be folded over the rear face of the cushion, while the lower edge thereof is provided with tabs 10, the free ends of which are to be tacked, or otherwise secured to the seat proper 11, of a vehicle.

In Figs. 5 to 10 inclusive, are shown covers for the seat and back forming cushions of what is known as coach seats, the cover 12 for the back forming cushion 13, having a tab 14 at each edge of the front forming section 15 thereof, which are to be folded over the edges of the cushion 13 and secured together over the back forming section 16 of the cover 12 by means of an elastic 17, or other suitable means.

The side edges of the back forming section 16 have strips 18 thereon, which are adapted to be folded over the edges of the cushion 13, prior to folding and securing the tabs 14 together and the extreme lower edge of the section 16 is provided with loops 19, preferably formed of elastic, which loops are to be introduced over the free ends of the seat supporting legs 20, which prevent the cover slipping upwardly and which will yield sufficiently to permit the back forming cushion 13 to be folded over the seat forming cushion 21.

The front and rear sections 15 and 16 are connected together at their top edges to form a top strip 22, which rests upon the top edge of the cushion 13 and limits the downward movement of the cover 12. Secured to each end of the top strip 22 and to the adjacent portions of the front and rear sections 15 and 16, are elastic sections 23, which serve to hold the cover in place over the cushion 13.

The cover 24, for the seat forming cushion 21 consists of a top forming section 25 and a depending section 26, the latter extending over the front and side edges of the cushion 21. At the ends of the depending section 26 are flaps 27, which are adapted to be folded over the rear face of the cushion 21 and the free ends thereof connected by a strip of elastic 28, or other suitable material, any suitable means being provided for removably securing one end of the elastic to one of the flaps 27, such as a snap fastener 29.

What I claim is:

1. In a covering for seat forming removable cushions, a fabric cover being open at one end and having a top forming portion said portion having a surplusage in length at the open end of the cover which serves to fold over the respective cushion end a different amount when the covering is applied to cushions of different lengths, a front forming wall united therewith, an end forming wall, and a flap integral at one end with the front forming wall serving to be folded across said respective end of the seat forming cushion and cover said respective end of the cushion in resemblance to the other cushion end and whatever part of said end of said top forming portion that may project onto said respective cushion end, said flap serving more or less as a part of the front wall of said covering in accordance with the length of the cushion to which it is applied, whereby said covering may be used on seats of different lengths, both ends and front wall of the covering presenting the same and uniform appearance when applied to different cushions of different lengths.

2. In a covering for seat forming removable cushions, a fabric cover being open at one end and having a top forming portion said portion having a surplusage in length at the open end of the cover and which serves to fold over the respective cushion end a different amount when the covering is applied to cushions of different lengths, a front forming wall united therewith, an end forming wall, and a flap integral at one end with the front forming wall serving to be folded across said respective end of the seat forming cushion and cover said respective end of the cushion in resemblance to the other cushion end and whatever part of said end of said top forming portion that may project onto said respective cushion end, said flap serving more or less as a part of the front wall of said covering in accordance with the length of the cushion to which it is applied and said flap having surplusage in length whereby a more or less amount of the end thereof may be accordingly extended along the back wall of the cushion, whereby said covering may be used on seats of different lengths, both ends and front wall of the covering presenting the same and uniform appearance when applied to different cushions of different lengths.

In testimony whereof, I have hereunto set my hand on this the 2nd day of May, 1930, A. D.

CHARLES H. WISHMEIER.